(12) United States Patent
Takemura et al.

(10) Patent No.: US 7,181,338 B2
(45) Date of Patent: Feb. 20, 2007

(54) KNOCK DETERMINING APPARATUS FOR INTERNAL COMBUSTION ENGINE

(75) Inventors: Yuichi Takemura, Anjo (JP); Rihito Kaneko, Nishikamo-gun (JP); Kenji Kasashima, Nishikamo-gun (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/302,318

(22) Filed: Dec. 14, 2005

(65) Prior Publication Data

US 2006/0129304 A1 Jun. 15, 2006

(30) Foreign Application Priority Data

Dec. 14, 2004 (JP) ............................. 2004-361063

(51) Int. Cl.
*F02P 5/152* (2006.01)
*G01L 23/22* (2006.01)

(52) U.S. Cl. .................................. 701/111; 123/406.37
(58) Field of Classification Search ................ 701/102, 701/110, 111, 114; 123/406.16, 406.21, 123/406.29, 406.34, 406.37–406.39; 73/35.01, 73/35.04, 35.07, 35.09, 117.2, 117.3, 118.1
See application file for complete search history.

(56) References Cited

U.S. PATENT DOCUMENTS

| | | | |
|---|---|---|---|
| 4,617,895 A | 10/1986 | Sakakibara et al. | 123/406.38 |
| 4,711,214 A | 12/1987 | Sakakibara et al. | 123/406.38 |
| 5,386,367 A | 1/1995 | Ziegler et al. | 701/111 |
| 5,598,822 A | 2/1997 | Fujishita et al. | 123/406.38 |
| 6,006,155 A | 12/1999 | Wu et al. | 701/111 |
| 6,234,146 B1 | 5/2001 | Tanaya et al. | 123/406.37 |
| 6,289,720 B1* | 9/2001 | Ohkubo et al. | 73/35.01 |
| 6,397,669 B1 | 6/2002 | Raichle et al. | 73/117.3 |
| 6,520,149 B2 | 2/2003 | Kokubo et al. | 123/406.37 |
| 6,546,328 B1* | 4/2003 | Slicker | 701/111 |
| 6,688,286 B2 | 2/2004 | Kokubo et al. | 123/406.33 |
| 2004/0158388 A1 | 8/2004 | Fujiwara et al. | 701/111 |
| 2004/0162668 A1 | 8/2004 | Rawlinson et al. | 701/111 |
| 2005/0234632 A1 | 10/2005 | Masuda et al. | 701/111 |

FOREIGN PATENT DOCUMENTS

| | | |
|---|---|---|
| EP | 0709662 A1 | 5/1996 |
| FR | 2 765 623 | 1/1999 |
| JP | 8-19890 | 3/1996 |
| JP | 2004-353531 | 12/2004 |

* cited by examiner

*Primary Examiner*—Stephen K. Cronin
*Assistant Examiner*—Johnny H. Hoang
(74) *Attorney, Agent, or Firm*—Nixon & Vanderhye P.C.

(57) ABSTRACT

For each predetermined crank angular interval, an output of a knock sensor is separated into a plurality of frequency components through a plurality of band-pass filters, and peak values of each frequency component are extracted. Then, a mean and a variance of the peak values are computed for each frequency component. A maximum one of the computed means is selected, and the corresponding frequency component, which is associated with the maximum mean, is selected. It is then determined whether the noise is present based on a ratio between the variance of the selected frequency component and the corresponding mean. If the noise is detected in any of the frequency components, execution of knock determination may be prohibited, or ignition timing feedback control according to a result of the knock determination may be prohibited, or ignition timing may be corrected by retarding the ignition timing.

34 Claims, 3 Drawing Sheets

KNOCK DETERMINING APPARATUS FOR INTERNAL COMBUSTION ENGINE

CROSS REFERENCE TO RELATED APPLICATION

This application is based on and incorporates herein by reference Japanese patent application No. 2004-361063 filed on Dec. 14, 2004. Furthermore, this application relates to the co-pending U.S. patent application Ser. No. 11/106,568 (U.S. patent application publication No. 2005/0234632A1) filed on Apr. 15, 2005, entitled "APPARATUS AND METHOD FOR CONTROLLING INTERNAL COMBUSTION ENGINE" and incorporated herein by reference.

BACKGROUND OF THE INVENTION

1. Field of the Invention

The present invention relates to a knock determining apparatus for an internal combustion engine.

2. Description of Related Art

In general, a knock determining apparatus for an internal combustion engine includes a knock sensor, which is installed in a cylinder block of the internal combustion engine to sense knock vibrations. A knock frequency component is extracted from an output signal of the knock sensor through a band-pass filter. In one exemplary case, peak values of the knock frequency component are compared with a corresponding knock determination threshold value to determine whether the knock is present. In another exemplary case, measured output values of knock frequency component in a predetermined period are integrated, and the integrated value is compared with a corresponding knock determination threshold value to determine whether the knock is present.

The generation of the knock may be limited or alleviated by retarding the ignition timing. However, when the ignition timing is retarded, the engine output power and the fuel consumption are deteriorated. Thus, it is required to advance the ignition timing within a permissible auditory knock sound range to improve the engine output power and the fuel consumption. Thus, the knock determination threshold value needs to be a value, which enables detection of only the certain knocks, which have a level that exceeds a permissible auditory level.

In view of the above points, as recited in Japanese Examined Patent Publication No. H06-60621 (corresponding to U.S. Pat. No. 4,617,895 and U.S. Pat. No. 4,711,214), it is known to correct the knock determination threshold value in such a manner that a distribution of logarithmically transformed values of the peak values of the output signal of the knock sensor have a predetermined shape or profile.

However, when noise (e.g., injection noise of a direct injection engine), which is larger than the knock vibrations, is constantly overlapped with the sensor output, the constant noise could be possibly erroneously determined as the knock vibrations, and thereby the knock determination accuracy is disadvantageously deteriorated under the presence of the noise generation.

SUMMARY OF THE INVENTION

The present invention addresses the above disadvantages. According to a first aspect of the present invention, there is provided a knock determining apparatus for an internal combustion engine. The knock determining apparatus includes a sensor, a knock determining means (knock determining section), a parameter computing means (parameter computing section) and a noise determining means (noise determining section). The sensor generates its sensor output as a signal, which forms a waveform that varies in response to a knock state of the engine. The knock determining means is for executing knock determination for determining presence of a knock based on the sensor output. The parameter computing means is for computing a parameter value, which represents a characteristic of noise of the engine, based on the sensor output. The parameter computing means computes the parameter value multiple times in each predetermined crank angular interval, so that a plurality of parameter values are computed by the parameter computing means in the predetermined crank angular interval. The noise determining means is for determining presence of the noise based on a characteristic of a distribution of the plurality of parameter values, which are computed by the parameter computing means.

BRIEF DESCRIPTION OF THE DRAWINGS

The invention, together with additional objectives, features and advantages thereof, will be best understood from the following description, the appended claims and the accompanying drawings in which:

Figure 1:
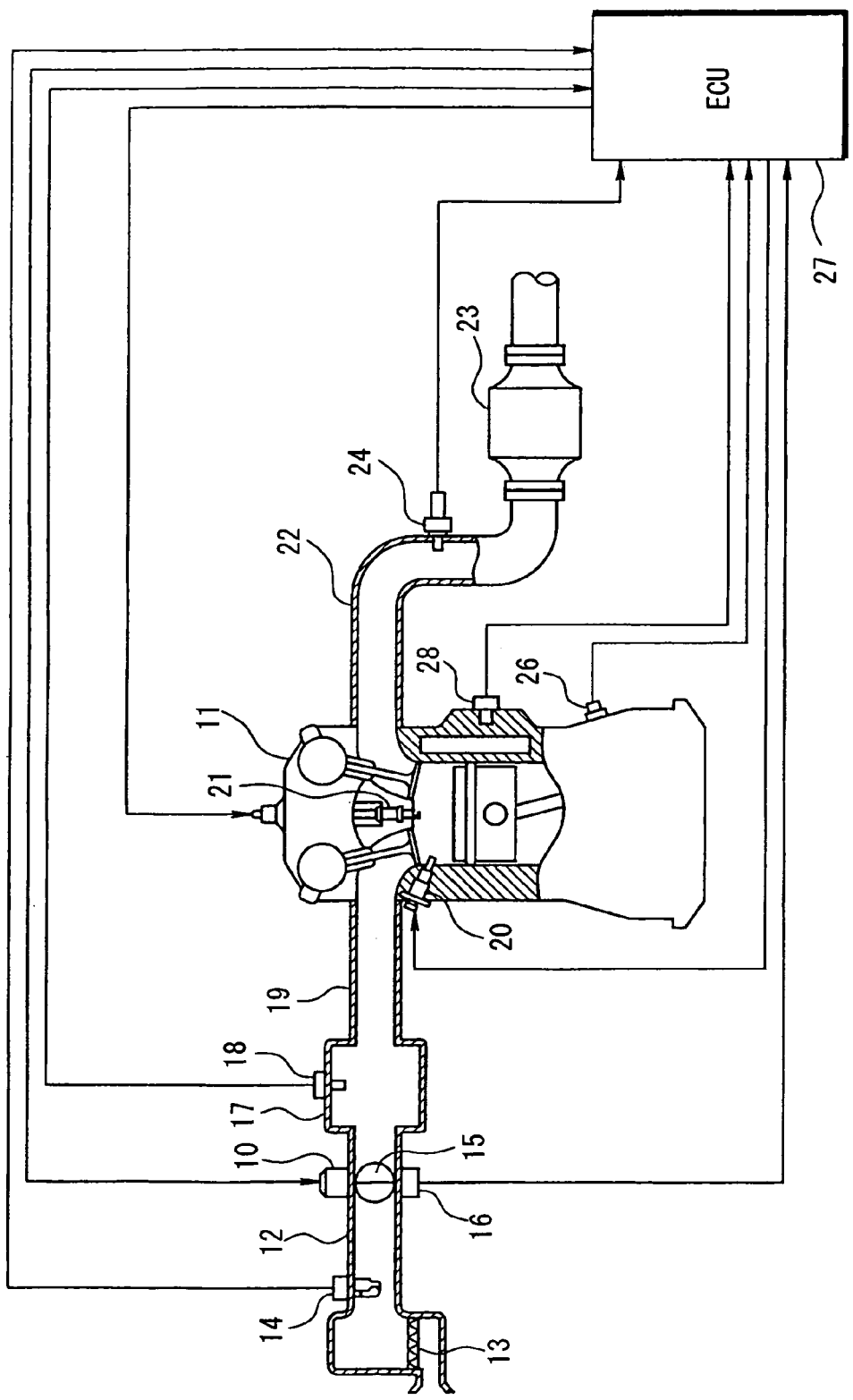
FIG. 1 is a schematic diagram schematically showing an entire structure of an engine control system according to a first embodiment of the present invention.

DETAILED DESCRIPTION OF THE INVENTION (First Embodiment)

A first embodiment of the present invention will be described with reference to FIGS. 1 to 4. An overall structure of an engine control system will be described with reference to FIG. 1. An air cleaner 13 is arranged in an upstream end part of an intake air pipe 12 of an internal combustion engine (hereinafter, simply referred to as an engine) 11, and an airflow meter 14 is arranged on a downstream side of the air cleaner 13 to measure an intake air quantity (an intake airflow rate). A throttle valve 15 and a throttle opening degree sensor 16 are arranged on a downstream side of the airflow meter 14. The throttle valve 15 is driven by a motor 10 to adjust a throttle opening degree of the throttle valve 15. The throttle opening degree sensor 16 senses the throttle opening degree of the throttle valve 15.

Furthermore, a surge tank 17 is arranged on a downstream side of the throttle valve 15, and an air intake pipe pressure sensor 18 is provided to the surge tank 17 to measure an intake air pipe pressure. Furthermore, an intake manifold 19 is connected to the surge tank 17 to supply air into each cylinder of the engine 11, and a fuel injection valve 20 is provided to each cylinder of the engine 11 to inject fuel into the cylinder. Spark plugs 21 are installed to a cylinder head of the engine 11 in such a manner that each spark plug 21 is provided to a corresponding one of the cylinders to ignite an air-fuel mixture in the cylinder with a spark produced from the spark plug 21.

A catalytic converter 23, such as a three-way catalytic converter, is arranged in an exhaust pipe 22 of the engine 11 to remove noxious components, such as CO, HC, NOx, contained in exhaust gas of the engine 11. An air-fuel ratio sensor 24 is arranged on an upstream side of the catalytic converter 23 to measure an air-fuel ratio of the exhaust gas. A knock sensor 28 and a crank angle sensor 26 are installed to the cylinder block of the engine 11. The knock sensor 28 senses knock vibrations. The crank angle sensor 26 outputs a pulse signal once every predetermined crank angular rotation of a crankshaft of the engine 11. A crank angle and an engine rotational speed are determined based on the output signals of the crank angle sensor 26.

The outputs of the above sensors are supplied to an engine control unit (ECU) 27. The ECU 27 includes a microcomputer as its main component. The ECU 27 executes various engine control programs, which are stored in a ROM (storage medium) of the ECU 27, to control, for example, a fuel injection quantity of each injection valve 20 and ignition timing of each spark plug 21.

A peripheral circuit of the ECU 27 includes a plurality of band-pass filters (frequency separating means or frequency separating section). The band-pass filters separate or filter the output of the knock sensor 28 (hereinafter, simply referred to as a sensor output) into a plurality of frequency components. The ECU 27 executes a noise/knock determination routine of FIG. 2, which will be described latter in greater detail. In the noise/knock determination routine, for example, peak values are extracted from each of the frequency components, which are obtained by separating the sensor output through the band-pass filters, in every predetermined crank angular interval (every knock determination interval). In this instance, it should be noted that the peak value is used as a parameter (a parameter value) of the present invention that represents a characteristic of constant noise (e.g., fuel injection noise of each injection valve 20) of the engine 11. Thereafter, for the respective crank angular interval, a mean and a variance of the peak values of each frequency component obtained in that crank angular interval are computed. Then, a maximum one of the computed means of all the frequency components is selected as a common mean (hereinafter, referred to as a maximum mean), which is common to all the frequency components. Next, for the respective frequency component, presence of the noise is determined, i.e., it is determined whether the noise is present based on a ratio between the variance of that frequency component and the maximum mean.

Here, in place of the peak value, a waveform correlation coefficient may be used as the parameter that represents the characteristic of the constant noise. The waveform correlation coefficient indicates correlation between a waveform of the sensor output and an ideal knock waveform, which represents a knock specific waveform. Further alternatively, an output intensity cumulative value (an intensity integrated value) obtained in the predetermined crank angular interval (the predetermined knock determination interval) may be used as the parameter that represents the characteristic of the constant noise.

Figure 3:
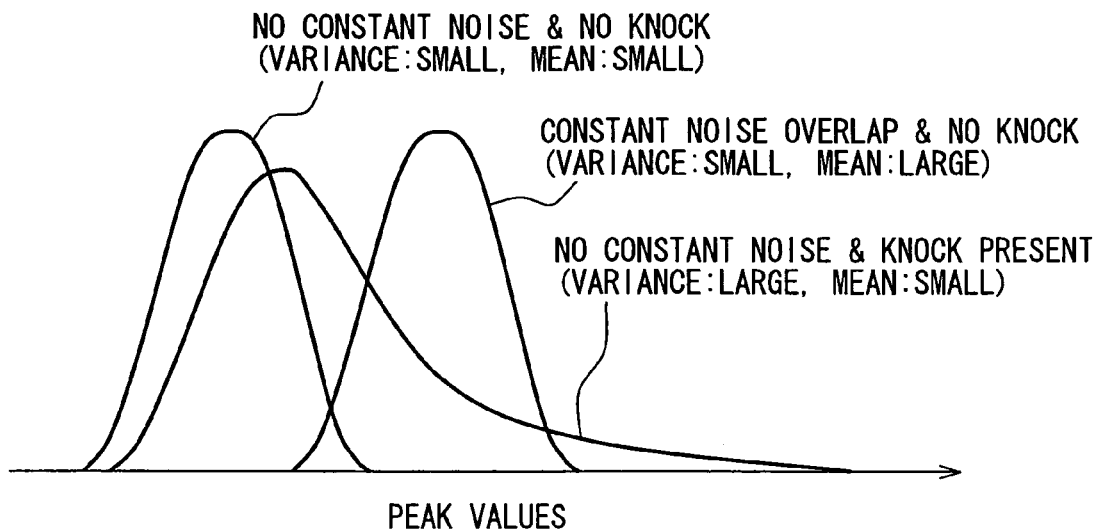
FIG. 3 is a diagram showing influences of noise and knock on peak values.

Influences of the noise and knock on the distribution of the peak values will be described with reference to FIG. 3 in view of the peak values. As shown in FIG. 3, when the constant noise (e.g., the injection noise of the direct injection engine 11) is overlapped with the sensor output, the mean of the peak values is substantially increased. In contrast, when the knock is overlapped with the sensor output, the mean of the peak values only slightly changes. Furthermore, when the constant noise is overlapped with the sensor output, the variance of the peak values (the width of the spread of the distribution) only slightly changes. In contrast, when the knock is overlapped with the sensor output, the variance (the width of the spread of the distribution) is substantially increased. The above characteristics can be more clearly distinguished by checking a ratio between the variance and the mean of the peak values (variance/mean). Specifically, when the constant noise is overlapped with the sensor output, the ratio between the variance and the mean of the peak values (variance/mean) is substantially reduced in comparison to the case where the constant noise is not present.

Figure 4:
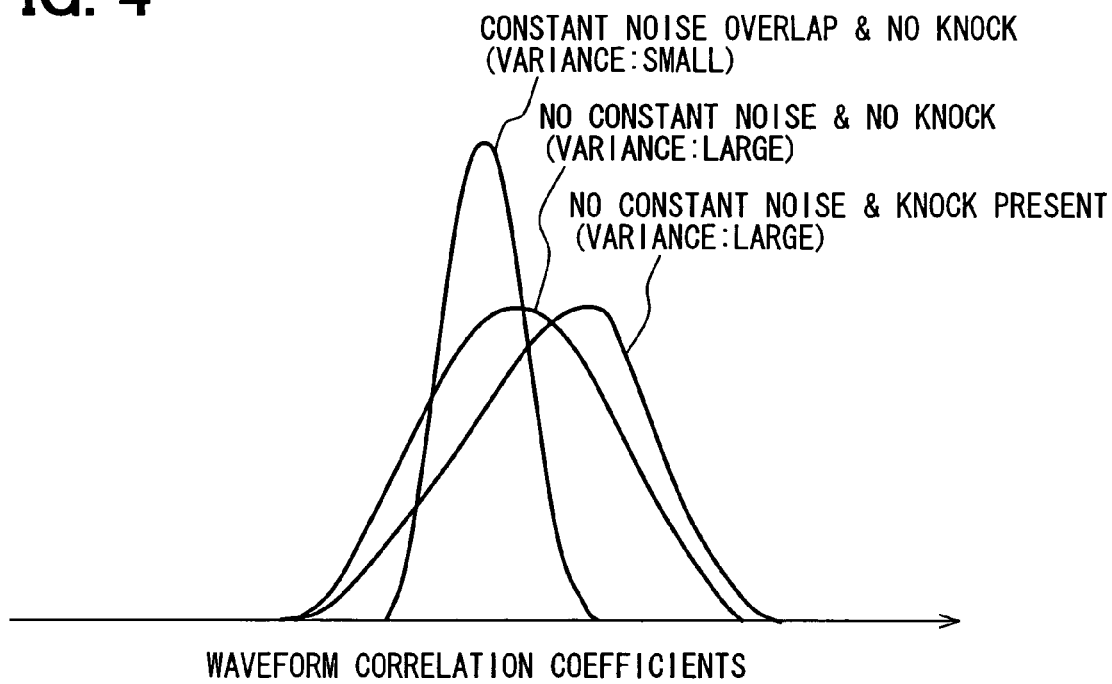
FIG. 4 is a diagram showing influences of the noise and knock on waveform correlation coefficients.

Next, influences of the noise and knock on the distribution of the waveform correlation coefficients will be described with reference to FIG. 4 in view of the waveform correlation coefficients. As shown in FIG. 4, when the constant noise is overlapped with the sensor output, the variance of the waveform correlation coefficients (the width of the spread of the distribution) is substantially decreased. In contrast, when the knock is overlapped with the sensor output, the variance of the waveform correlation coefficients (the width of the spread of the distribution) only slightly changes. Even in this case, it may be determined whether the noise exists based on a ratio between the variance and the mean of the waveform correlation coefficients.

In the first embodiment, it is determined whether the noise is present based on the ratio between the variance and the mean of the peak values. Alternatively, it is possible to determine whether the noise is present based on the ratio between the variance and the mean of the waveform correlation coefficients. Further alternatively, it is possible to determine whether the noise is present based on both the peak values and the waveform correlation coefficients. Furthermore, in place of the variance, a standard deviation may be used. That is, any numerical data value, which serves as an index that indicates the width of the spread of the distribution, can be used in place of the variance.

Furthermore, it is possible to determine whether the noise is present based on a ratio between the measured current peak value (or the measured current waveform correlation coefficient) and its corresponding mean. That is, it is possible to determined whether the noise is present based on the numerical data value, which is produced by quantifying the characteristic of the distribution of the peak values (or the waveform correlation coefficients). In place of the peak values (or the waveform correlation coefficients), the output intensity cumulative values (intensity integrated values) of the predetermined crank angular interval may be used. That is, in place of the peak value (or the waveform correlation coefficient), any parameter, which is extracted from the sensor output of the predetermined crank angular interval and represents the characteristic of the constant noise, can be used.

In general, when the number of data values $X1, X2, \ldots Xn$ is denoted as n, a mean Xav, a variance V and a standard deviation $\sigma$ are defined as follows.

Mean $Xav=(X1+X2+ \ldots +Xn)/n$

Variance $V=\{(X1-Xav)^2+(X2-Xav)^2+ \ldots +(Xn-Xav)^2\}/n$

Standard Deviation $\sigma=\sqrt{V}$

The above ordinary equations can be effectively used in the computation of the mean and the variance of the peak values of the present embodiment. However, when the mean and the variance of the peak values are computed through the above ordinal definitional equations, a large amount of data is produced during the predetermined time period, and thereby a large storage space of the RAM is required. In some systems, such as the engine control system, where relevant information needs to be renewed for every ignition or every fuel injection of the respective cylinder, the available space of the RAM, which can be used for the computations of the mean and the variance, is limited. Thus, in reality, it may be difficult to directly execute the computation method, which uses the above definitional equations, in the case where the available space of the RAM or storage is limited.

Furthermore, when the operational condition of the engine 11 is changed, the sensor output and its peak value are also changed. Thus, in the case where the operational condition of the engine 11 is changed from one condition to the other condition in the middle of the storing operation for storing the data of the peak values in the RAM, the mean and the variance could be computed based on the mixed peak values, which are obtained during the different operational conditions. This results in deterioration of the accuracy of the mean and variance. That is, in the computation method, which uses the ordinary definitional equations, the trackability (or accuracy) of the mean and variance is insufficient in the transient state from one operational condition to another operational condition.

According to one illustrative example of the present embodiment, in order to address the above disadvantages, every time when each peak value of the sensor output in the predetermined crank angular interval (the knock determination interval) is measured, the measured peak value undergoes a smoothing process (an annealing process, a first order time lag process) to approximately compute a corresponding mean of the measured peak value (i.e., an approximate mean of the possible peak values in the predetermined crank angular interval). As described above, when the smoothing process is used in the computation of the mean, the mean can be renewed from peak to peak during every predetermined crank angular interval, in which the peak values of the sensor output are measured. Thus, it is no longer required to maintain a large amount of data in the RAM of the ECU 27. As a result, the mean can be approximately computed through use of the relatively small RAM storage space, and the trackability (or accuracy) in the transient state can be improved.

According to the general definitional equation, the mean of the peak values is the arithmetic mean of all of the peak values measured in the respective crank angular interval, and the variance is the arithmetic mean of computed values of (peak value−mean)$^2$, each of which is computed for the corresponding one of measured peak values. In view of the above relationship, it is conceivable that the above method, in which the mean of the peak values is approximately computed through the smoothing process of each peak value, is equally applicable in the computation method of the variance, i.e., [arithmetic mean of computed values of (peak value−mean)$^2$]. More specifically, it is conceivable to approximately compute the variance, i.e., [arithmetic mean of computed values of (peak value−mean)$^2$] through a smoothing process of each computed value of (peak value−mean)$^2$.

In the first embodiment, in the case where the mean of the peak values is approximately computed as the smoothed value obtained by the smoothing process of each peak value, each computed value of (peak value−mean)$^2$ should be a value, which is computed by squaring a difference between the peak value before the smoothing process and the peak value after the smoothing process thereof. Thus, in the case of obtaining both the mean and variance of the peak values through the smoothing processes, the peak value is processed first through the smoothing process to approximately compute the mean, and the difference between the peak value before the smoothing process and the peak value after the smoothing process is squared and is then processed in the smoothing process to approximately compute the variance.

Figure 2:
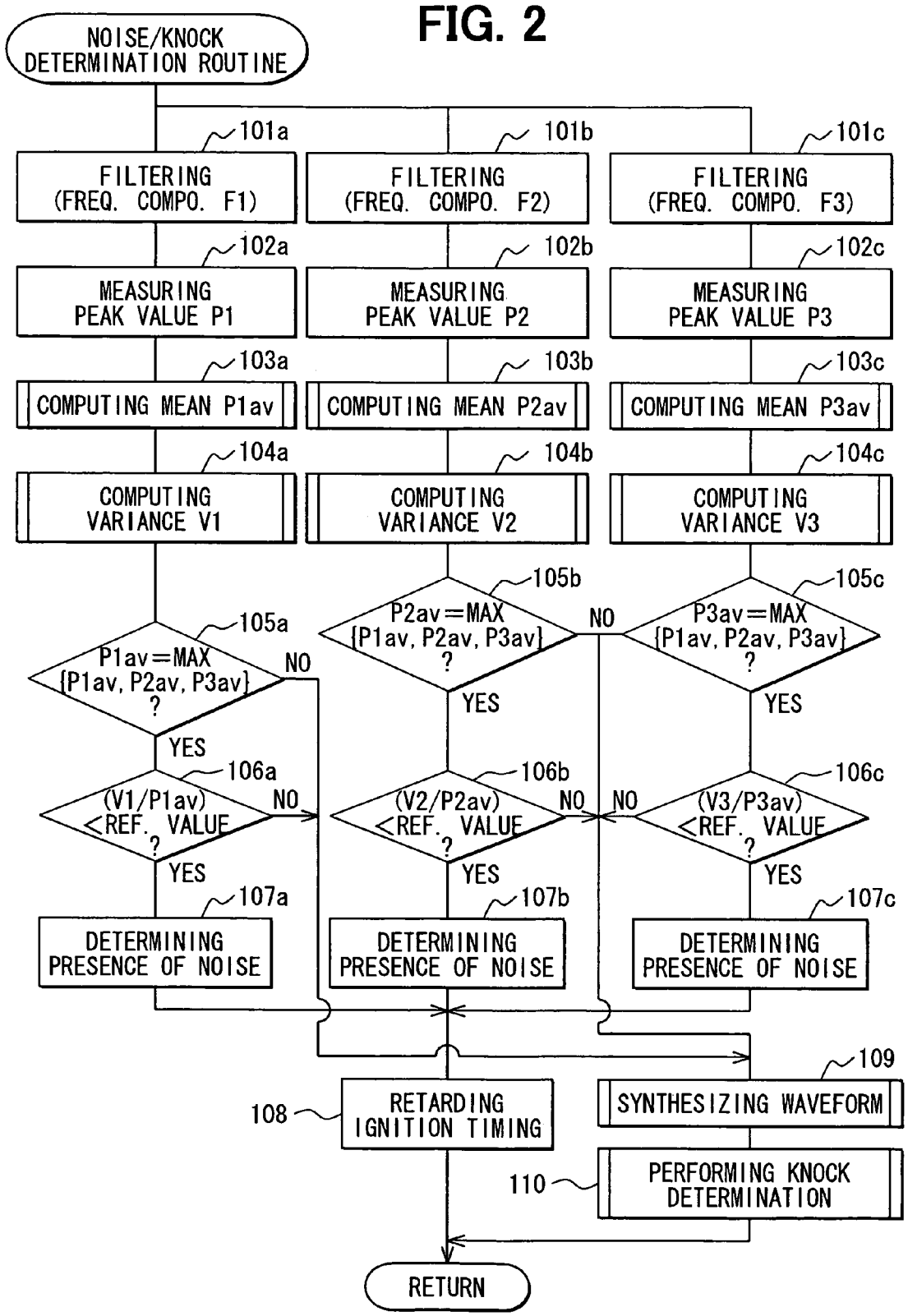
FIG. 2 is a flowchart showing a noise/knock determination routine according to the first embodiment.

Now, the noise/knock determination routine of FIG. 2, which is executed by the ECU 27, will be described. The present routine is periodically executed during the engine operation and serves as a parameter computing means (parameter computing section), a noise determining means (noise determining section) and a knock determining means (knock determining section).

When the present routine is started, the sensor output is separated or filtered into the three frequency components F1, F2, F3 through the three band-pass filters at steps 101a, 101b, 101c. Alternatively, it should be understood that the sensor output may be separated into two frequency components or may be separated into four or more frequency components through corresponding filters.

Then, the respective peak values P1, P2, P3 of the frequency components F1, F2, F3 in the predetermined crank angular interval are measured at steps 102a, 102b, 102c, respectively. Thereafter, control proceeds to steps 103a, 103b, 103c where each peak value P1, P2, P3 is processed through the smoothing process (the annealing process, the first order time lag process) according to the following equations to approximately compute the mean P1av, P2av, P3av of each peak value P1, P2, P3.

$$P1av \text{ (current value)}=\alpha1\times P1+(1-\alpha1)\times P1av \text{ (previous value)}$$

$$P2av \text{ (current value)}=\alpha2\times P2+(1-\alpha2)\times P2av \text{ (previous value)}$$

$$P3av \text{ (current value)}=\alpha3\times P3+(1-\alpha3)\times P3av \text{ (previous value)}$$

Here, $\alpha1$, $\alpha2$, $\alpha3$ are annealing coefficients and can be set as the same common value or can be set as different values, respectively.

Thereafter, control proceeds to steps 104a, 104b, 104c where the variances V1, V2, V3, each of which serves as the index that indicates the width of the spread of the distribution of the corresponding peak value P1, P2, P3, are computed according to the following equations.

$$V1 \text{ (current value)}=\beta1\times(P1-P1av)^2+(1-\beta1)\times V1 \text{ (previous value)}$$

$$V2 \text{ (current value)}=\beta2\times(P2-P2av)^2+(1-2)\times V2 \text{ (previous value)}$$

$$V3 \text{ (current value)}=\beta3\times(P3-P3av)^2+(1-3)\times V3 \text{ (previous value)}$$

Here, $\beta1$, $\beta2$, $\beta3$ are annealing coefficients and can be set as the same common value or can be set as different values, respectively.

Then, control proceeds to steps 105a, 105b, 105c where one of the three frequency components, which is associated with the maximum one of the three means P1av, P2av, P3av, is selected. More specifically, only the frequency component, which is associated with the maximum mean, is forward to the next step (one of steps 106a, 106b, 106c), and the frequency components of the rest of the means other than the maximum mean are forward to steps 109, which will be described in greater detail below.

As discussed above, the frequency component, which is associated with the maximum mean, is forwarded to the next step (the one of steps 106a, 106b, 106c) where a ratio between the variance and the mean is computed, and this computed variance-to-mean ratio (i.e., the variance/mean ratio) is compared with a preset noise determination reference value. When the variance-to-mean ratio is smaller than the noise determination reference value, it is determined that the noise is present (one of steps 107a, 107b, 107c). In contrast, when the variance-to-mean ratio is equal to or larger than the noise determination reference value, it is determined that the noise is not present.

Alternatively, all the means P1av, P2av, P3av of the frequency components F1, F2, F3 may be directly used to compute the ratio between the variance V1 and the mean P1av, the ratio between the variance V2 and the mean P2av and the ratio between the variance V3 and the mean P3av. Then, these computed ratios may be compared with the corresponding noise determination reference value to determine whether the noise is present for each of all the frequency components F1, F2, F3.

Further alternatively, the corresponding one of the three frequency components F1, F2, F3, which is associated with the maximum one of the peak values P1, P2, P3 of the three frequency components F1, F2, F3, may be selected. Then, it may be determined whether a ratio between the maximum peak value and its corresponding approximated mean is smaller than the corresponding preset noise determination reference value to determine whether the noise is present.

Further alternatively, it is possible to individually compute the ratio between the peak value P1 and the mean P1av of the frequency component F1, the ratio between the peak value P2 and the mean P2av of the frequency component F2, and the ratio between the peak value P3 and the mean P3av of the frequency component F3, and these computed ratios may be then compared with the corresponding noise determination reference value to determine whether the noise is present.

When it is determined that the noise is present in any one of the three frequency components F1, F2, F3, control proceeds to step 108 where the ignition timing is corrected by retarding the ignition timing. In this way, even in a case where the knock, which occurs concurrently at the time of generation of the noise, cannot be properly sensed, the knock can be limited or alleviated through the correction of the ignition timing by retarding the ignition timing.

In contrast, when it is determined that the noise is not present in each of the three frequency components F1, F2, F3, control proceeds to step 109 where the waveforms of the respective frequency components F1, F2, F3 are synthesized. Specifically, measured intensity values, which are extracted from the respective frequency component F1, F2, F3 in each of equally divided segments of the respective crank angular interval, are cumulated (i.e., integrated) to obtain an integrated value of the intensity values (intensity integrated value) of that segment. This computation is repeated for the rest of the equally divided segments of the respective crank angular interval, so that a plurality of integrated values for that particular crank angular interval is obtained and is used to synthesize a corresponding waveform for that particular crank angular interval. The above process is repeated for the rest of the frequency components F1, F2, F3. In a case where the noise is sensed in one of the three frequency components F1, F2, F3, the waveform may be synthesized for each of the other two frequency components, in which the noise is not sensed. Alternatively, when the noise is sensed in at least one of the three frequency components F1, F2, F3, the synthesis of the waveform may be stopped, so that the knock determination for determining the presence of the knock is not completed or is stopped.

After the waveforms are synthesized, control proceeds to step 110 where each synthesized waveform is compared with an ideal knock waveform representing a knock specific waveform. Then, waveform correlation coefficients, which indicate a correlation between the synthesized waveform and the ideal knock waveform, are computed and are compared with a corresponding knock determination reference value to determine whether the knock is present.

In the first embodiment, as shown in FIGS. 3 and 4, based on the fact that the distributions of the peak values and of the waveform correlation coefficients at the time of presence of the noise are substantially different from those at the time of absence of the noise, it is determined whether the noise is present according to the distribution characteristics. Thus, the knock determination can be performed after the noise, which is overlapped with the sensor output, is distinguished from the knock vibrations, which is overlapped with the sensor output. As a result, the accuracy and reliability of the knock determination can be improved.

(Second Embodiment)

It is noted that the constant noise tends to occur normally in a certain crank angular interval. Thus, according to the second embodiment, when the noise is sensed in any one of the frequency components F1, F2, F3, the subject noise generating crank angular interval (hereinafter, referred to as a noise generating interval), in which the noise is sensed, is identified. This identified noise generating interval is stored in a rewritable non-volatile memory (e.g., a backup RAM) of the ECU 27, and thereafter the knock determination in this noise generating interval is prohibited.

A method for sensing the noise generating interval may be as follows. That is, the peak values of the frequency component, from which the noise is sensed, may be regarded as the noise, and the relative position of these peak values may be sensed based on a count value (a counter value) of output pulses of the crank angle sensor 26. Alternatively, the position of these peak values may be sensed based on an elapsed time period from a specific initial crank angle. Further alternatively, at the time of sensing the noise, the knock determination interval (the predetermined crank angular interval) may be divided into a plurality of segments, and the peak values or the intensity integrated values (measured values) of each segment may be obtained. Then, the segment(s), in which the maximum measured value is present, may be set as the noise generating segment(s) or noise generating interval.

According to the second embodiment, the noise determination is prohibited in the noise generating interval, so that it is possible to obviate occurrence of erroneous knock determination.

In place of the prohibition of the knock determination in the noise generating interval, the ignition timing feedback control according to the result of the knock determination may be prohibited in the noise generating interval. In this way, even in a case where the knock determination is continuously performed in the noise generating interval, and thereby the erroneous knock determination occurs, the feedback control of the ignition timing in a wrong direction (a forwarding direction or a retarding direction) based on the erroneous knock determination can be avoided in advance.

(Third Embodiment)

It is noted that the constant noise tends to occur normally in a certain operational condition. Thus, according to the third embodiment, when the noise is sensed or detected in any one of the frequency components F1, F2, F3, the subject noise generating operational condition (hereinafter, referred to as a noise generating operational condition), in which the noise is sensed, is identified. This identified noise generating operational condition is stored in the rewritable non-volatile memory (e.g., the backup RAM) of the ECU 27, and thereafter the knock determination in this noise generating operational condition is prohibited. In this way, it is possible to obviate occurrence of erroneous knock determination caused by the constant noise.

In place of the prohibition of the knock determination in the noise generating operational condition, the ignition timing feedback control according to the result of the knock determination may be prohibited in the noise generating operational condition. In this way, even in a case where the knock determination is continuously performed in the noise generating operational condition, and thereby the erroneous knock determination occurs, the feedback control of the ignition timing in a wrong direction (the forwarding direction or the retarding direction) based on the erroneous knock determination can be avoided in advance.

Alternatively, in the noise generating operational condition, the ignition timing may be corrected by retarding the ignition timing. In this way, even in a case where the knock cannot be properly sensed due to the presence of the noise, it is possible to correct the ignition timing by retarding the ignition timing and thereby to limit or alleviate the knock.

In each of the above embodiments, the sensor output is divided into the multiple frequency components through the multiple band-pass filters. However, the present invention is not limited to this. For example, it is not absolutely required to divide the sensor output, and the peak values of the undevided sensor output may be measured to determine whether the noise is present in the manner similar to that of any of the above embodiments. Then, when the presence of the noise is sensed, one of the prohibition of the knock determination, the prohibition of the ignition timing feedback control and the correction of the ignition timing by the retardation of the ignition timing may be performed.

Furthermore, in each of the above embodiments, the knock sensor 28, which senses the vibrations of the cylinder block, is used as the sensor, which outputs the signal having the corresponding waveform that corresponds to the knock state. However, alternative to the knock sensor 28, a combustion pressure sensor, which senses the combustion pressure, may be used. Further alternatively, an ionic current sensor, which senses an ionic current in the combustion chamber, may be used in place of the knock sensor 28.

The above embodiments can be modified in various ways. For example, the knock determination method of the above embodiments can be modified in various ways.

Additional advantages and modifications will readily occur to those skilled in the art. The invention in its broader terms is therefore not limited to the specific details, representative apparatus, and illustrative examples shown and described.

What is claimed is:

1. A knock determining apparatus for an internal combustion engine, the knock determining apparatus comprising:
    a sensor that generates its sensor output as a signal, which forms a waveform that varies in response to a knock state of the engine;
    a knock determining means for executing knock determination for determining presence of a knock based on the sensor output;
    a parameter computing means for computing a parameter value, which represents a characteristic of noise of the engine, based on the sensor output, wherein the parameter computing means computes the parameter value multiple times in each predetermined crank angular interval, so that a plurality of parameter values are computed by the parameter computing means in the predetermined crank angular interval; and
    a noise determining means for determining presence of the noise based on a characteristic of a distribution of the plurality of parameter values, which are computed by the parameter computing means.

2. The knock determining apparatus according to claim 1, wherein the noise determining means determines the presence of the noise based on at least one of:
    a width of a spread of the distribution of the plurality of parameter values; and
    a mean of the plurality of parameter values.

3. The knock determining apparatus according to claim 1, wherein the plurality of parameter values, which are computed by the parameter computing means, includes at least one of:
    a plurality of peak values of the sensor output in the predetermined crank angular interval;
    a plurality of intensity integrated values of the sensor output in the predetermined crank angular interval; and
    a plurality of waveform correlation coefficients that are obtained through comparison between the waveform of the sensor output and an ideal knock waveform representing a knock specific waveform.

4. The knock determining apparatus according to claim 1, wherein the noise determining means computes a mean of the plurality of parameter values and a variance of the plurality of parameter values and determines the presence of the noise based on a ratio between the variance and the mean, which is used as an index that represents the characteristic of the distribution of the plurality of parameter values.

5. The knock determining apparatus according to claim 1, wherein:
    the noise determining means executes a smoothing process for smoothing each current one of the plurality of parameter values, which are computed by the parameter computing means in the predetermined crank angular interval, so that the noise determining means approximately computes a mean of the plurality of parameter values based on the current parameter value; and
    the noise determining means determines the presence of the noise based on a ratio between the current parameter value and the mean.

6. The knock determining apparatus according to claim 1, wherein the noise determining means prohibits execution of the knock determination by the knock determining means when the noise is detected by the noise determining means.

7. The knock determining apparatus according to claim 1, wherein the noise determining means corrects ignition timing of the engine by retarding the ignition timing when the noise is detected by the noise determining means.

8. The knock determining apparatus according to claim 1, further comprising a frequency separating means for separating the sensor output into a plurality of frequency components, wherein:
    the parameter computing means computes the plurality of parameter values for each of the plurality of frequency components in each predetermined crank angular interval; and the noise determining means determines the presence of the noise in each of the plurality of frequency components based on a characteristic of a distribution of the plurality of parameter values of each of the plurality of frequency components.

9. The knock determining apparatus according to claim 8, wherein:

the noise determining means computes a mean of the plurality of parameter values for each of the plurality of frequency components, so that a plurality of means is generated for the plurality of frequency components;

the noise determining means selects one of the plurality of frequency components, which is associated with a maximum one of the plurality of means; and the noise determining means determines the presence of the noise based on one of:

a ratio between a current one of the plurality of parameter values, which are associated with the selected one of the plurality of frequency components, and the corresponding mean of the plurality of parameter values, which are associated with the selected one of the plurality of frequency components; and a ratio between a variance of the plurality of parameter values, which are associated with the selected one of the plurality of frequency components, and the corresponding mean of the plurality of parameter values, which are associated with the selected one of the plurality of frequency components.

10. The knock determining apparatus according to claim 8, wherein:

the noise determining means computes a mean of the plurality of parameter values for each of the plurality of frequency components, so that a plurality of means is generated for the plurality of frequency components;

the noise determining means selects one of the plurality of frequency components, which is associated with a maximum one of the current ones of the plurality parameter values of the plurality of frequency components; and the noise determining means determines the presence of the noise based on one of:

a ratio between a current one of the plurality of parameter values, which are associated with the selected one of the plurality of frequency components, and the corresponding mean of the plurality of parameter values, which are associated with the selected one of the plurality of frequency components; and a ratio between a variance of the plurality of parameter values, which are associated with the selected one of the plurality of frequency components, and the corresponding mean of the plurality of parameter values, which are associated with the selected one of the plurality of frequency components.

11. The knock determining apparatus according to claim 8, wherein when the noise is detected by the noise determining means in at least one of the plurality of frequency components, the knock determining means uses the rest of the plurality of frequency components other than the at least one of the plurality of frequency components to execute the knock determination.

12. The knock determining apparatus according to claim 8, wherein:

the knock determining means selects one or more of the plurality of frequency components, from which the noise is not detected by the noise determining means;

the knock determining means synthesizes a waveform for each of the selected one or more of the plurality of frequency components; and the knock determining means executes the knock determination based on the synthesized waveform of each of the selected one or more of the plurality of frequency components.

13. The knock determining apparatus according to claim 8, wherein the noise determining means prohibits execution of the knock determination by the knock determining means when the noise is detected by the noise determining means in at least one of the plurality of frequency components.

14. The knock determining apparatus according to claim 1, wherein:

the noise determining means identifies and stores a noise generating crank angular interval, in which the noise is detected by the noise determining means; and the noise determining means thereafter prohibits execution of the knock determination by the knock determining means in the noise generating crank angular interval.

15. The knock determining apparatus according to claim 1, wherein:

the noise determining means identifies and stores a noise generating operational condition of the engine, in which the noise is detected by the noise determining means; and the noise determining means thereafter prohibits execution of the knock determination by the knock determining means in the noise generating operational condition.

16. The knock determining apparatus according to claim 1, wherein:

the noise determining means identifies and stores a noise generating operational condition of the engine, in which the noise is detected by the noise determining means; and the noise determining means thereafter prohibits feedback control of ignition timing of the engine, which is executed based on a result of the knock determination of the knock determining means, in the noise generating operational condition.

17. The knock determining apparatus according to claim 1, wherein:

the noise determining means identifies and stores a noise generating operational condition of the engine, in which the noise is detected by the noise determining means; and the noise determining means thereafter corrects ignition timing of the engine by retarding the ignition timing in the noise generating operational condition.

18. A knock determining apparatus for an internal combustion engine, the knock determining apparatus comprising:

a sensor that generates its sensor output as a signal, which forms a waveform that varies in response to a knock state of the engine;

a knock determining section that executes knock determination for determining presence of a knock based on the sensor output;

a parameter computing section that computes a parameter value, which represents a characteristic of noise of the engine, based on the sensor output, wherein the parameter computing section computes the parameter value multiple times in each predetermined crank angular interval, so that a plurality of parameter values are computed by the parameter computing section in the predetermined crank angular interval; and a noise determining section that determines presence of the noise based on a characteristic of a distribution of the plurality of parameter values, which are computed by the parameter computing section.

19. The knock determining apparatus according to claim 18, wherein the noise determining section determines the presence of the noise based on at least one of:

a width of a spread of the distribution of the plurality of parameter values; and a mean of the plurality of parameter values.

20. The knock determining apparatus according to claim 18, wherein the plurality of parameter values, which are computed by the parameter computing section, includes at least one of:

a plurality of peak values of the sensor output in the predetermined crank angular interval;

a plurality of intensity integrated values of the sensor output in the predetermined crank angular interval; and a plurality of waveform correlation coefficients that are obtained through comparison between the waveform of the sensor output and an ideal knock waveform representing a knock specific waveform.

21. The knock determining apparatus according to claim 18, wherein the noise determining section computes a mean of the plurality of parameter values and a variance of the plurality of parameter values and determines the presence of the noise based on a ratio between the variance and the mean, which is used as an index that represents the characteristic of the distribution of the plurality of parameter values.

22. The knock determining apparatus according to claim 18, wherein:

the noise determining section executes a smoothing process for smoothing each current one of the plurality of parameter values, which are computed by the parameter computing section in the predetermined crank angular interval, so that the noise determining section approximately computes a mean of the plurality of parameter values based on the current parameter value; and the noise determining section determines the presence of the noise based on a ratio between the current parameter value and the mean.

23. The knock determining apparatus according to claim 18, wherein the noise determining section prohibits execution of the knock determination by the knock determining section when the noise is detected by the noise determining section.

24. The knock determining apparatus according to claim 18, wherein the noise determining section corrects ignition timing of the engine by retarding the ignition timing when the noise is detected by the noise determining section.

25. The knock determining apparatus according to claim 18, further comprising a frequency separating section for separating the sensor output into a plurality of frequency components, wherein:

the parameter computing section computes the plurality of parameter values for each of the plurality of frequency components in each predetermined crank angular interval; and the noise determining section determines the presence of the noise in each of the plurality of frequency components based on a characteristic of a distribution of the plurality of parameter values of each of the plurality of frequency components.

26. The knock determining apparatus according to claim 25, wherein:

the noise determining section computes a mean of the plurality of parameter values for each of the plurality of frequency components, so that a plurality of means is generated for the plurality of frequency components;

the noise determining section selects one of the plurality of frequency components, which is associated with a maximum one of the plurality of means; and the noise determining section determines the presence of the noise based on one of:

a ratio between a current one of the plurality of parameter values, which are associated with the selected one of the plurality of frequency components, and the corresponding mean of the plurality of parameter values, which are associated with the selected one of the plurality of frequency components; and a ratio between a variance of the plurality of parameter values, which are associated with the selected one of the plurality of frequency components, and the corresponding mean of the plurality of parameter values, which are associated with the selected one of the plurality of frequency components.

27. The knock determining apparatus according to claim 25, wherein:

the noise determining section computes a mean of the plurality of parameter values for each of the plurality of frequency components, so that a plurality of means is generated for the plurality of frequency components;

the noise determining section selects one of the plurality of frequency components, which is associated with a maximum one of the current ones of the plurality parameter values of the plurality of frequency components; and the noise determining section determines the presence of the noise based on one of:

a ratio between a current one of the plurality of parameter values, which are associated with the selected one of the plurality of frequency components, and the corresponding mean of the plurality of parameter values, which are associated with the selected one of the plurality of frequency components; and a ratio between a variance of the plurality of parameter values, which are associated with the selected one of the plurality of frequency components, and the corresponding mean of the plurality of parameter values, which are associated with the selected one of the plurality of frequency components.

28. The knock determining apparatus according to claim 25, wherein when the noise is detected by the noise determining section in at least one of the plurality of frequency components, the knock determining section uses the rest of the plurality of frequency components other than the at least one of the plurality of frequency components to execute the knock determination.

29. The knock determining apparatus according to claim 25, wherein:

the knock determining section selects one or more of the plurality of frequency components, from which the noise is not detected by the noise determining section;

the knock determining section synthesizes a waveform for each of the selected one or more of the plurality of frequency components; and the knock determining section executes the knock determination based on the synthesized waveform of each of the selected one or more of the plurality of frequency components.

30. The knock determining apparatus according to claim 25, wherein the noise determining section prohibits execution of the knock determination by the knock determining section when the noise is detected by the noise determining section in at least one of the plurality of frequency components.

31. The knock determining apparatus according to claim 18, wherein:
   the noise determining section identifies and stores a noise generating crank angular interval, in which the noise is detected by the noise determining section; and
   the noise determining section thereafter prohibits execution of the knock determination by the knock determining section in the noise generating crank angular interval.

32. The knock determining apparatus according to claim 18, wherein:
   the noise determining section identifies and stores a noise generating operational condition of the engine, in which the noise is detected by the noise determining section; and
   the noise determining section thereafter prohibits execution of the knock determination by the knock determining section in the noise generating operational condition.

33. The knock determining apparatus according to claim 18, wherein:
   the noise determining section identifies and stores a noise generating operational condition of the engine, in which the noise is detected by the noise determining section; and
   the noise determining section thereafter prohibits feedback control of ignition timing of the engine, which is executed based on a result of the knock determination of the knock determining section, in the noise generating operational condition.

34. The knock determining apparatus according to claim 18, wherein:
   the noise determining section identifies and stores a noise generating operational condition of the engine, in which the noise is detected by the noise determining section; and
   the noise determining section thereafter corrects ignition timing of the engine by retarding the ignition timing in the noise generating operational condition.

* * * * *